(12) United States Patent
Liu

(10) Patent No.: US 11,807,326 B2
(45) Date of Patent: Nov. 7, 2023

(54) CONCEALED BICYCLE LOCK SYSTEM AND SETUP METHOD THEREOF

(71) Applicant: TEAM YOUNG TECHNOLOGY CO., LTD., Taoyuan (TW)

(72) Inventor: Chih-Hung Liu, Taoyuan (TW)

(73) Assignee: TEAM YOUNG TECHNOLOGY CO., LTD., Taoyuan (TW)

( * ) Notice: Subject to any disclaimer, the term of this patent is extended or adjusted under 35 U.S.C. 154(b) by 399 days.

(21) Appl. No.: 17/338,704

(22) Filed: Jun. 4, 2021

(65) Prior Publication Data
US 2021/0394849 A1     Dec. 23, 2021

(30) Foreign Application Priority Data

Jun. 23, 2020   (TW) ................................ 109121401

(51) Int. Cl.
*B62H 5/06*   (2006.01)
(52) U.S. Cl.
CPC ..................................... *B62H 5/06* (2013.01)
(58) Field of Classification Search
CPC ... B62H 5/00; B62H 5/02; B62H 5/04; B62H 5/06
USPC ........................................................ 70/187
See application file for complete search history.

(56) References Cited

U.S. PATENT DOCUMENTS

| 5,085,063 A | * | 2/1992 | Van Dyke | B62H 5/04 70/389 |
| 6,237,376 B1 | * | 5/2001 | Surratt | B62H 5/04 70/183 |
| 11,738,816 B2 | * | 8/2023 | Liu | E05B 71/00 70/174 |
| 2015/0091272 A1 | * | 4/2015 | Gibson | B62K 21/24 280/279 |
| 2022/0017169 A1 | * | 1/2022 | Liu | B62H 5/003 |

FOREIGN PATENT DOCUMENTS

| CN | 2197298 | | 5/1995 |
| CN | 2197298 Y | * | 5/1995 |
| CN | 203020495 | | 6/2013 |
| CN | 204641956 | | 9/2015 |
| TW | 210617 | | 8/1993 |
| TW | M557221 | | 3/2018 |

* cited by examiner

*Primary Examiner* — Nathan Cumar
(74) *Attorney, Agent, or Firm* — JCIPRNET

(57) ABSTRACT

The disclosure discloses a concealed bicycle lock system and a setup method thereof. The lock system of the disclosure includes a lock with an upper shaft and a lower shaft. The upper shaft is configured to link and move with a handlebar via a stem; the lower shaft is configured to link and move with a front wheel by embedding the lower shaft into a fork tube. When the lock is in a locked mode, the upper shaft and the lower shaft are not linked to move together. In contrast, the upper shaft and the lower shaft are linked to move together in an unlocked mode. A user may set up the lock without performing destructive modification to the bicycle.

10 Claims, 11 Drawing Sheets

CONCEALED BICYCLE LOCK SYSTEM AND SETUP METHOD THEREOF

CROSS-REFERENCE TO RELATED APPLICATION

This application claims the priority benefit of Taiwan application serial no. 109121401, filed on Jun. 23, 2020. The entirety of the above-mentioned patent application is hereby incorporated by reference herein and made a part of this specification.

BACKGROUND

Technical Field

The disclosure relates to a bicycle lock system and a setup method thereof, and in particular to a concealed bicycle lock system, which may be simply set up without performing destructive modification to a bicycle, and a setup method thereof.

Description of Related Art

In order to solve the problem of a difficulty in storing traditional bicycle locks, such as D-locks, there exists an integrated lock that can be secured to the body of a bicycle. In addition, there exists a hidden lock that can be stored inside a frame or a fork tube. A user may use a key or the like to swirl an exposed lock cylinder to drive a latch to lock and unlock.

However, in locking most of the current hidden locks, a design of a latch penetrating both the fork tube and a head tube is often used to prevent a rotation of the fork tube or a stem. However, regarding the hidden locks as described above, the head tube and the fork tube have to be disposed with concentric perforations for the latch to penetrate. In addition, there exist other similar types of locks, which require the latch to pass through the fork tube to drive a toothed element disposed between the head tube and the fork tube, and use a connection and disconnection status of the toothed element to control a linkage mode between the head tube and the fork tube. But similarly, all the designs as described above require a modifier commissioned to perform destructive modification such as brazing and perforation to the bicycle. The setup is difficult, and setup cost is high. In addition, once destructively modified, the bicycle would be negatively impacted in terms of structure resistance and a price thereof in a second-hand market.

Furthermore, there exists another lock, which is disposed with a positioning sleeve. A top surface of the positioning sleeve is disposed with multiple blind holes. Said another lock is disposed at a terminal of the head tube of an original bicycle. During setup, a user locks an annular lock to a top of the positioning sleeve with a screw, so that a vertical distance between the annular lock and a positioning ring may be maintained, and the positioning sleeve may rotate independently relative to the annular lock. During application, the fork tube penetrates a hollow part of the annular lock and is fixed to the annular lock. When the lock is in an unlocked mode, the annular lock and the positioning ring are movable relative to each other, so that the fork tube and the head tube may rotate relative to each other. When the lock is in a locked mode, an upper annular lock extends the latch to a positioning hole and snap the latch into the positioning hole of the positioning sleeve to prevent the fork tube from rotating relative to the head tube. However, in order to ensure that the positioning ring does not rotate along with the head tube, the head tube needs to be destructively modified by cutting multiple toothed slots on an end surface of the head tube for the positioning ring to be embedded in to ensure a fixed position of the positioning ring. Accordingly, the problem of the difficulty in the setup of conventional hidden locks and the destructive modification requirement is still not solved.

In summary, in the design of most of the known hidden stem locks, a latch that passes through both the fork tube and the head tube or the toothed element disposed between the head tube and the fork tube is configured to prevent the rotation of the fork tube or the stem relative to the head tube to achieve locking. The above design requires the fork tube or the head tube of the bicycle to be customized or destructively modified before setup, and the setup process is complicated. Therefore, the design is difficult to be promoted in a parts market (also known as an aftermarket).

SUMMARY

In view of the related art, one of the objectives of the disclosure is to provide a concealed bicycle lock system, which can be set up by users with simple steps and without destructive modification to the bicycle, and a setup method thereof. Taking one of the feasible designs of the concealed bicycle lock system of the disclosure as an example, locking is not achieved by combining a head tube and a fork tube or a stem; instead, unlocking and locking are achieved through controlling the stem and the fork tube to be linked to move together or not to be linked to move together. The setup requires the following. First, the stem is disassembled to expose the fork tube. A connector is embedded into the fork tube. The connector is secured into the fork tube by using a fastener. A lower shaft of the bicycle lock is inserted into the fork tube and is extended. Next, the stem is fitted in an upper shaft of the bicycle lock and locked, and the setup of the hidden bicycle lock is thus completed. The process of the lock system setup is simple and does not require destructive modification to the bicycle.

Specifically, an aspect of the disclosure relates to a concealed bicycle lock system, including: a connector, including: a side plate; a substrate, disposed on an inner side of a lower end of the side plate, and the substrate is disposed with a securing hole; a cantilever, disposed on an outer side of an upper end of the side plate, and the cantilever is configured to restrict a displacement of a head tube of a bicycle relative to a fork tube in a direction vertical to a diameter direction of the head tube; a fastener, configured to secure the substrate of the connector to inside of the fork tube of the bicycle through the securing hole; and a lock, including an upper shaft and a lower shaft, and the lower shaft includes an expansion mechanism. When the substrate is fixed into the fork tube by the fastener, the side plate covers a part of an inner side wall of the fork tube, and when the expansion mechanism expands, the expansion mechanism abuts against and is fixed to another part of the inner side wall that is not covered by the side plate.

In any of the concealed bicycle lock systems as described above, the connector includes multiple side plates. The lower ends of the side plates are respectively connected to the substrate. Outer sides of the upper ends of the side plates are respectively disposed with the cantilever. At least one channel is defined between the side plates. The channel has two lateral openings, and the two lateral openings are configured to allow the expansion mechanism to pass through when the expansion mechanism expands. The cantilevers of the connector surround an annulus opening, and a profile of the annulus opening corresponds to an outer profile of the lower shaft.

In any of the concealed bicycle lock systems as described above, the upper shaft and the lower shaft of the lock are connected in a lock body. The upper shaft is configured to connect to a stem of the bicycle and to link and move with the stem of the bicycle, and the lower shaft is configured to connect to the fork tube of the bicycle and to link and move with the fork tube of the bicycle. The lock includes a locked mode and an unlocked mode. When the lock is in the locked mode, the upper shaft and lower shaft are not linked to move together, and when the lock is in the unlocked mode, the upper shaft and the lower shaft are linked to move together.

In any of the concealed bicycle lock systems as described above, the expansion mechanism includes an upper expanding part and a lower expanding part. The upper expanding part and the lower expanding part are connected via an inclined interface. An end surface of the upper shaft exposes a terminal of a drive part. The drive part is connected to the lower expanding part, and through swirling the drive part, the lower expanding part has a displacement along the inclined interface relative to the upper expanding part to allow the lower shaft to expand and move in a horizontal direction, thereby controlling an expansion and a convergence of the expansion mechanism.

In any of the concealed bicycle lock systems as described above, the upper expanding part includes a front curved surface, and the lower expanding part includes a back curved surface. The upper expanding part and the lower expanding part are respectively disposed with a vertical section corresponding to the side plate. The upper expanding part is configured to be connected to the inner side wall of a side of the fork tube via the front curved surface, and the lower expanding part is configured to be connected to the inner side wall of another side of the fork tube via the back curved surface.

Any of the concealed bicycle lock systems as described above further includes a gasket, configured to be fitted over a terminal of the fork tube to allow a terminal height of the fork tube to be lower than the gasket. In addition, the cantilever of the connector is configured to fit the gasket.

Another aspect of the disclosure relates to a setup method of a concealed bicycle lock system, including the following steps: a lock preparing step: in which any of the concealed bicycle lock systems as described above is provided; a bicycle preparing step: in which the bicycle, including the head tube and the fork tube, is provided, and the head tube is rotatively fitted over an outside of the fork tube; a connector placement step: in which the substrate of the connector is embedded into the fork tube; a connector locking step: in which the connector is secured into the fork tube through the substrate by using the fastener, and multiple cantilevers are allowed to be located outside the fork tube and connected to the head tube to restrict the displacement of the head tube of the bicycle relative to the fork tube in the direction vertical to the diameter direction of the head tube; a lock placement step: in which the lower shaft of the lock is inserted into the fork tube; and a lock securing step: in which the expansion mechanism of the lower shaft is allowed to expand horizontally to allow the expansion mechanism to abut against the inner side wall of the fork tube that is not covered by the side plate, so that the lower shaft and the fork tube are linked to move together.

The lock preparing step in any of the setup methods of the concealed bicycle lock system as described above further includes a gasket preparing sub-step: in which at least one gasket is provided. The setup method further includes a gasket placement step: in which the at least one gasket is fitted over a terminal of the fork tube so that a terminal height of the fork tube is lower than the gasket. The gasket preparing sub-step and the gasket placement step are completed before the connector placement step begins. In the connector securing step, multiple cantilevers are connected to the head tube via the at least one gasket.

To further describe the above and other objectives, features and advantages of the disclosure, exemplary embodiments accompanied with drawings are described below in details.

DESCRIPTION OF THE EMBODIMENTS

The foregoing and other technical contents, features and effects of the disclosure will be clearly presented in the detailed description of an exemplary embodiment below. The direction terms mentioned in the following embodiment, such as: up, down, left, right, front, back, top, bottom, side, etc., are used to describe the relative relationship of each element and a design thereof, and are not used to limit the usage of the disclosure.

In short, an embodiment of the disclosure discloses a concealed bicycle lock system (hereinafter referred to as the lock system). The lock system of the disclosure includes a lock. The lock is disposed with an upper shaft and a lower shaft. The upper shaft is configured to link and move with a handlebar via a stem; and the lower shaft is configured to link and move with a front wheel by being embedded in a fork tube and then expanding and abutting an internal side wall of the fork tube. When the lock is in a locked mode, the upper shaft and the lower shaft are not linked to move together, and a user cannot control the front wheel to rotate by swirling the handlebar, so that the bicycle cannot be ridden normally, thus achieving an anti-theft effect. Furthermore, with the fixing method of expanding the lower shaft of the lock in the fork tube, the user may easily set up the lock without performing destructive modification to the bicycle.

However, if the lower shaft of the lock is directly inserted into the fork tube and expanded and fixed, it is very likely that there is a vertical gap between the fork tube and the head tube during setup, so that after the lock setup, the fork tube has a vertical up and down displacement relative to the head tube, affecting the riding experience. Based on the above, an example of the disclosure further proposes the following. Before the setup of the lock, a connector is used to press the fork tube in the head tube upwards. After the fork tube and the head tube are tightly combined, the lock is set up into the fork tube from an upper opening of the fork tube. The above may ensure that after the lock setup, the fork tube does not move up and down relative to the head tube.

Figure 1A:
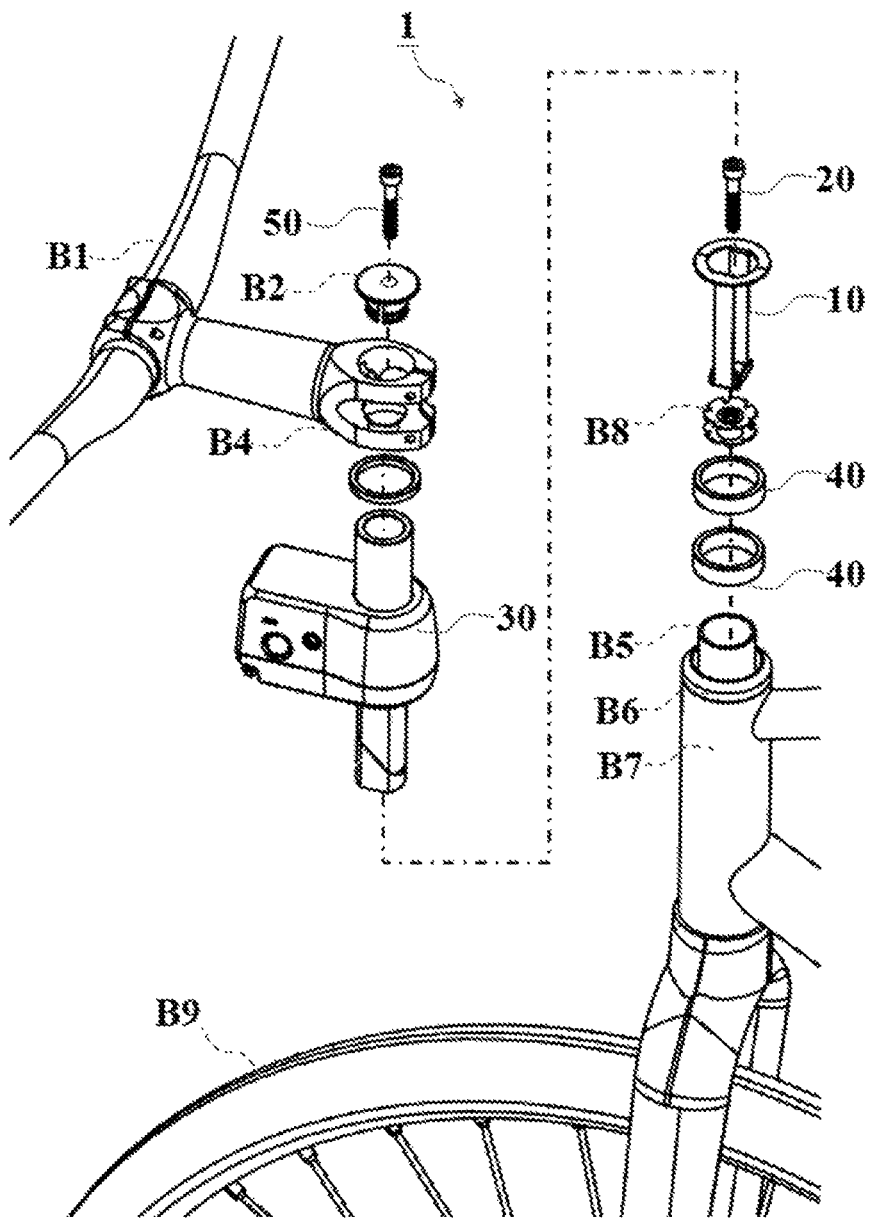
FIGS. 1A and 1B respectively illustrate schematic views of a decomposing status and a combining status in the first embodiment of the lock system of the disclosure.
Figure 1B:
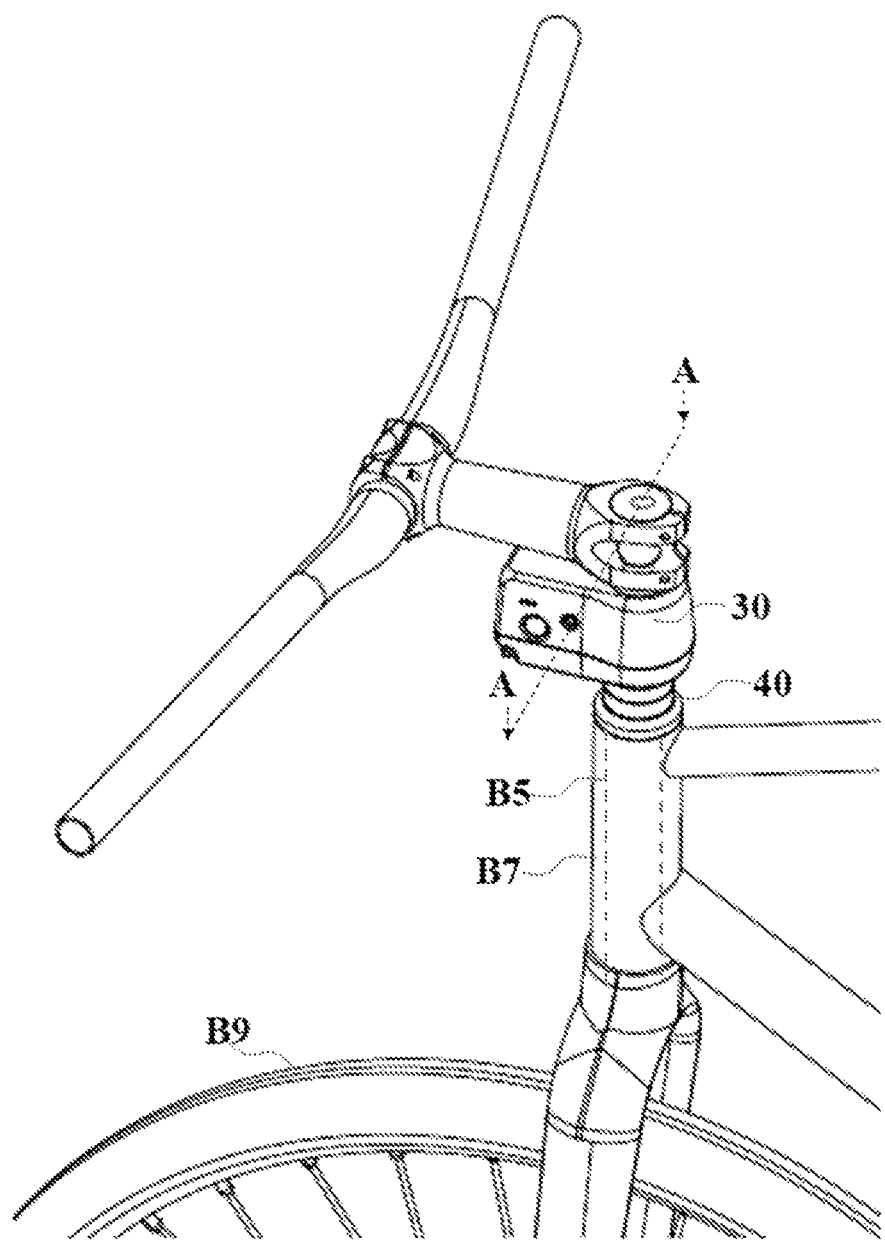

The detailed design of the lock system will be described below. Referring to FIGS. 1A and 1B, FIGS. 1A and 1B respectively illustrate schematic views of a decomposing status and a combining status in the first embodiment of the lock system of the disclosure.

First of all, it should be emphasized that the bicycle and the parts thereof mentioned in this specification, for example, a handlebar B1, a stem cap B2, a screw B3, a stem B4, a fork tube B5, a headset B6, a head tube B7, a star fangled nut B8, a front wheel B9, and other parts that are already stored on the bicycle in the factory, are only used to assist in expressing the design of a lock system 1 and a usage thereof. The descriptions of the parts do not mean that lock system 1 includes any part originally stored on the bicycle.

As can be seen from FIG. 1A, in this embodiment, the lock system 1 includes main elements such as a connector 10, a fastener 20, a lock 30, multiple gaskets 40, and a screw 50. The cross-sectional schematic views in the subsequent drawings are cut along a cross-sectional datum line A-A in FIG. 1B.

Figure 2:
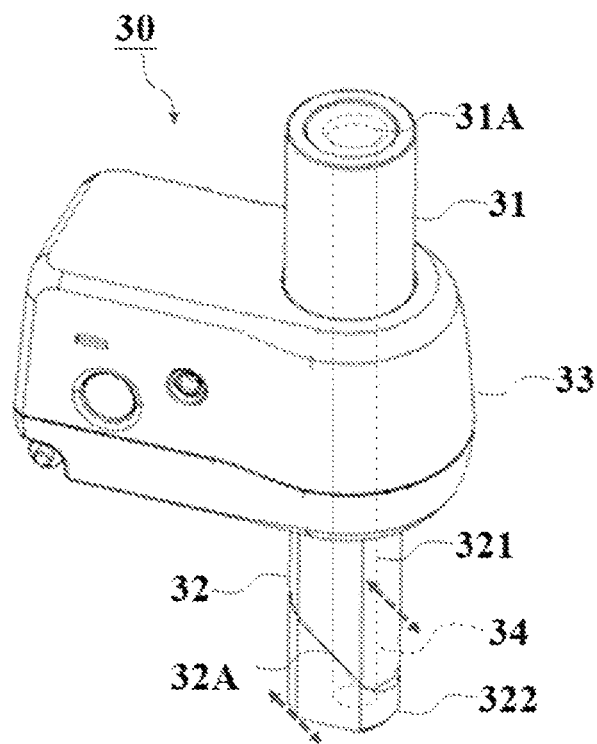
FIG. 2 illustrates a schematic view of a lock in the first embodiment of the lock system of the disclosure.

Referring to FIG. 2 together with FIG. 1, FIG. 2 illustrates a schematic view of the lock in the first embodiment of the lock system of the disclosure. The lock 30 is configured to link and move with the stem B4 and the fork tube B5 of the bicycle, and the linkage of the stem B4 and the fork tube B5 is adjusted through the lock 30 switching between a locked mode and an unlocked mode to achieve the purpose of restricting the use. The lock 30 may selectively be an electronic lock or a mechanical lock. In the first embodiment, the lock 30 is an electronic lock. It can be seen from the drawing that the lock 30 should at least include a case 33, an upper shaft 31, a lower shaft 32, and a drive part 34. The case 33 is configured as the lock body, and the upper shaft 31 and the lower shaft 32 are connected in the lock body and respectively pass through the upper and lower sides thereof. When the lock 30 is in the locked mode, the upper shaft 31 and the lower shaft 32 are not linked to move together, and in the unlocked mode, the upper shaft 31 and the lower shaft 32 are linked to move together. In an embodiment, the upper shaft 31 and the lower shaft 32 may be linked to move together with, for example, a latch, but the disclosure is not limited thereto. The upper shaft 31 and the lower shaft 32 may also respectively use stepped structures, toothed structures, and other structures thereof to cooperate with the vertical movement of the upper shaft 31 and the lower shaft 32 to adjust the linkage between the above two, and the disclosure is not limited thereto.

Figure 4A:
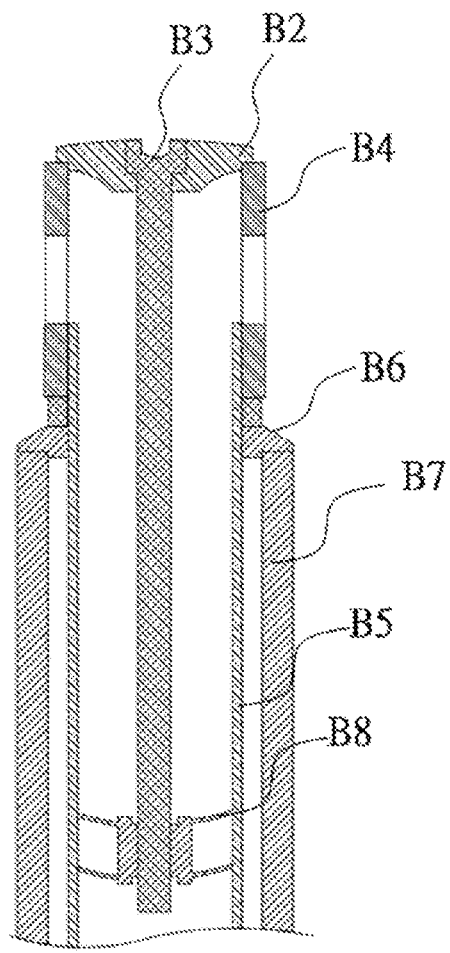
FIG. 4A illustrates a schematic view of a relative relationship between a head tube and a fork tube at a connecting position thereof of a bicycle.
Figure 4B:
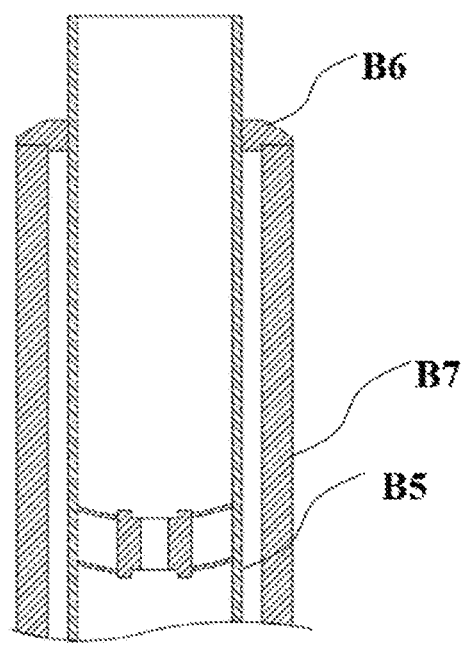
FIG. 4B illustrates a schematic view of when a disassembling step is completed in the first embodiment of the lock system of the disclosure.
Figure 4C:
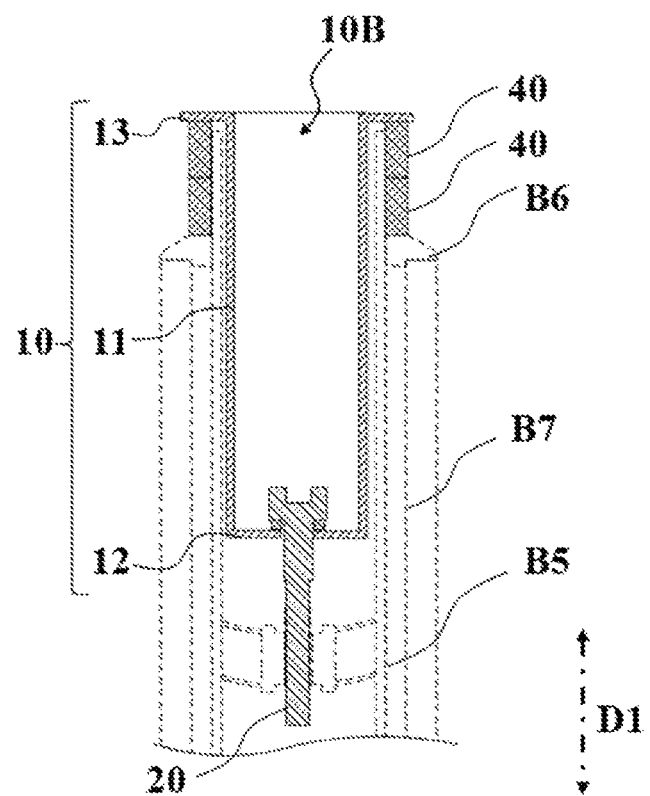
FIG. 4C illustrates a schematic view of when a gasket placement step and a connector placement step are completed in the first embodiment of the lock system of the disclosure.
Figure 4D:
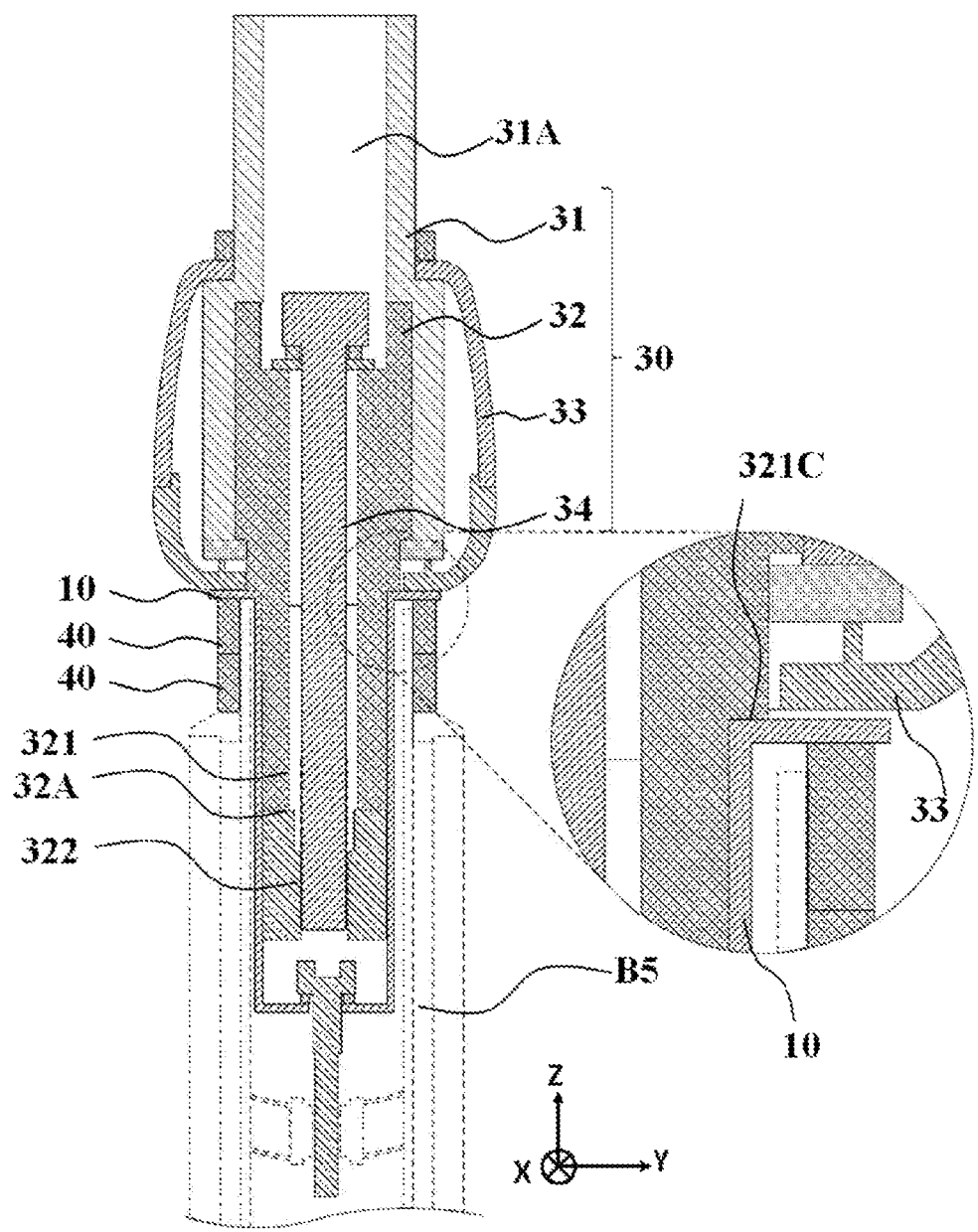
FIG. 4D illustrates a schematic view of when a lock placement step is completed in the first embodiment of the lock system of the disclosure.

Referring to FIGS. 2 and 4D, FIG. 4D includes details of an internal design of the lock. It can be seen from the drawing that the upper shaft 31 and the lower shaft 32 are both hollow cylinders. The lower shaft 32 is disposed with an expansion mechanism; in other words, a part of the lower shaft 32 where the case 33 is exposed may be divided into two parts. According to a relative position of the two parts, the two parts are referred to as an upper expanding part 321 and a lower expanding part 322. The upper expanding part 321, the lower expanding part 322 cooperate with the drive part 34 and other elements to form an expansion mechanism. The upper expanding part 321 and the lower expanding part 322 each have a hollow tubular wedge-shaped structure; a lower end surface of the upper expanding part 321 and an upper end surface of the lower expanding part 322 are respectively disposed with an inclined plane and may be connected via an inclined interface 32A. The slope of the two inclined planes as described above are similar. In addition, in this embodiment, a perforation inside the upper expanding part 321 is larger than an outer diameter of the drive part 34.

Figure 6A:
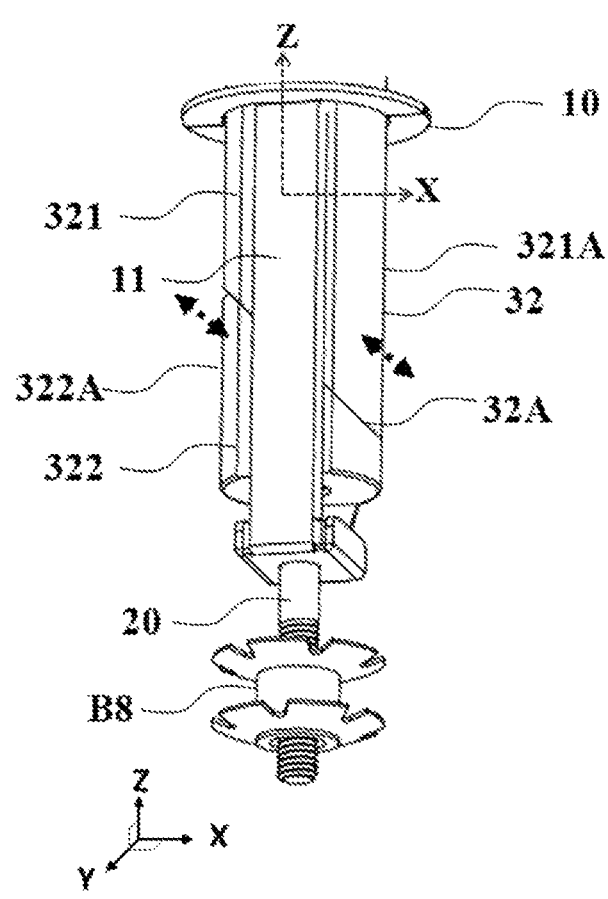
FIGS. 6A and 6B respectively illustrate schematic views of a part of the elements before a lock securing step begins and after the lock securing step is completed in the first embodiment of the lock system of the disclosure.
Figure 6B:
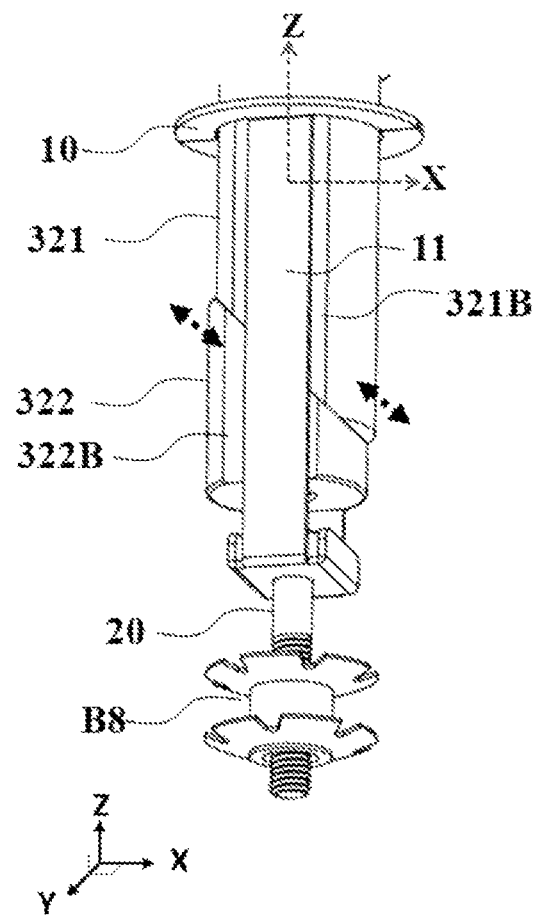

Referring to FIGS. 4D, 6A and 6B together, FIGS. 6A and 6B show relative positions of each element when the lock expansion mechanism converges and expands. It can be seen from the drawings that the drive part 34 is a long screw with external threads on a terminal thereof. The drive part 34 penetrates both the upper shaft 31 and the upper expanding part 321 of the lower shaft 32, and is locked by the external threads at the terminal of the drive part 34 and internal threads of the lower expanding part 322. An upper opening 31A of the upper shaft 31 exposes a terminal of the drive part 34; that is, although the drive part 34 is embedded in the upper shaft 31, an upper end surface of the drive part 34 may communicate with the outside via the upper opening 31A of the upper shaft 31. Therefore, when the expansion mechanism needs to be expanded, the user may use a tool to rotate the drive part 34 through the upper opening 31A of the upper shaft 31 to drive the lower expanding part 322 to press towards the upper expanding part 321. Since the perforation inside the upper expanding part 321 is greater than the outer diameter of the drive part 34, the drive part 34 may shift or incline to a certain degree inside the upper expanding part 321 when the lower expanding part 322 presses upwards, so that along the inclined interface 32A, the lower expanding part 322 is allowed to have a displacement relative to the upper expanding part 321 to a certain degree, thereby controlling the expansion of the expansion mechanism and allowing the lower shaft 32 to move and expand in the horizontal direction. The result of the above is as depicted in FIG. 6B. On the contrary, the user may control the convergence of the expansion mechanism by rotating the drive part 34 in a reverse direction, and the result is as depicted in FIG. 6A. In addition to the expansion mechanism example described in the previous example, other known mechanisms or elements that may achieve a similar fixing effect may also be used, and the disclosure is not limited thereto.

Figure 3:
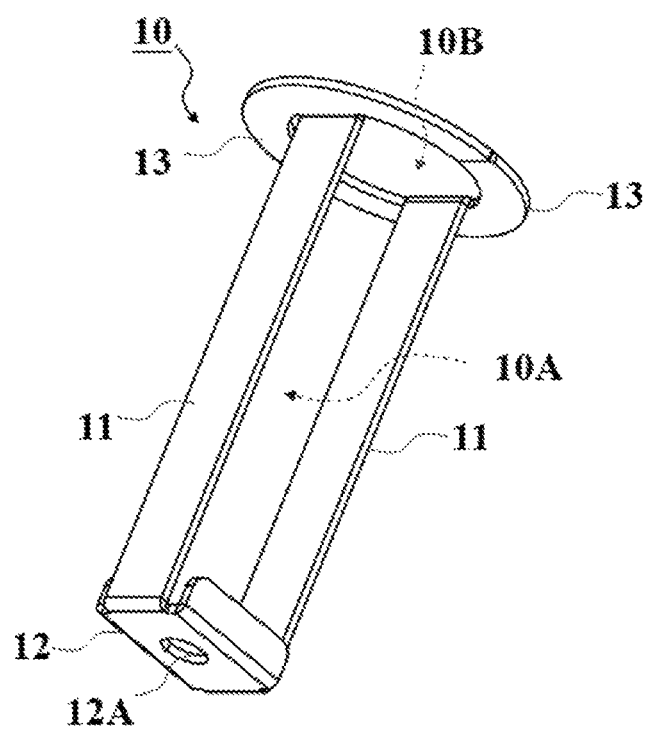
FIG. 3 illustrates a schematic view of a connector in the first embodiment of the lock system of the disclosure.

Referring to FIG. 3, FIG. 3 illustrates a schematic view of the connector in the first embodiment of the lock system of the disclosure. The connector 10 is configured to allow the fork tube B5 and the head tube B7 of the bicycle to be tightly pressed against each other, and to restrict a vertical displacement between the above two, in order to prevent the lock 30 from being shaken due to a gap between the head tube B7 and the fork tube B5 because the lock 30 is embedded to the fork tube B5.

In the first embodiment, the entirety of the connector 10 may be, for example, a single piece of metal material manufactured by a stamping process and is one piece formed; that is, a thickness of each part of the connector 10 is substantially the same. However, the thickness of each part of the connector 10 is not limited to being the same. When necessary, the connector 10 may be manufactured by casting or brazing multiple elements. In this embodiment, a main profile of the connector 10 has a roughly U-shaped design, and the connector 10 includes two side plates 11, a substrate 12, and two cantilevers 13. The two side plates 11 are rectangular in shape and disposed parallel to each other, and lower ends of the two side plates 11 are connected by the substrate 12 located between inner sides of the two side plates 11, and an outer side of an upper end of each side plate 11 is disposed with the cantilever 13. The cantilever 13 bends and extends towards the outside from an edge of the upper end of the side plate 11. The two cantilevers 13 are respectively half-moon-shaped, located at a same height, and surround an annulus opening 10B. Since the connector 10 in this embodiment is formed by stamping a single metal plate and then folded symmetrically, there may be two notches on both sides of the annulus opening 10B, but the two notches do not affect the use of the disclosure. In this embodiment, a channel 10A is defined between the two parallel side plates 11, and both ends of the channel 10A have a lateral opening that is not blocked by the side plates 11. The substrate 12 is disposed with a securing hole 12A that penetrates the substrate 12.

Figure 5A:
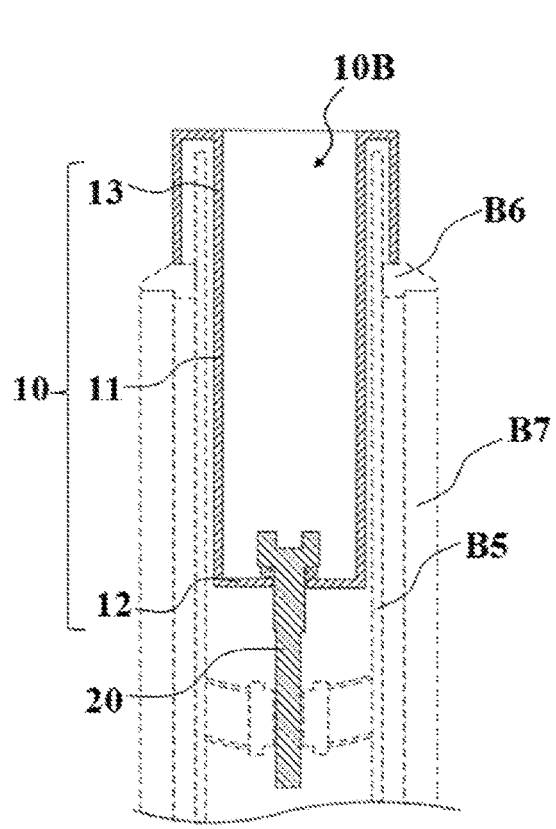
FIGS. 5A and 5B respectively illustrate schematic views of a part of the elements when a connector placement step is completed in the second embodiment and the third embodiment of the lock system of the disclosure.
Figure 5B:
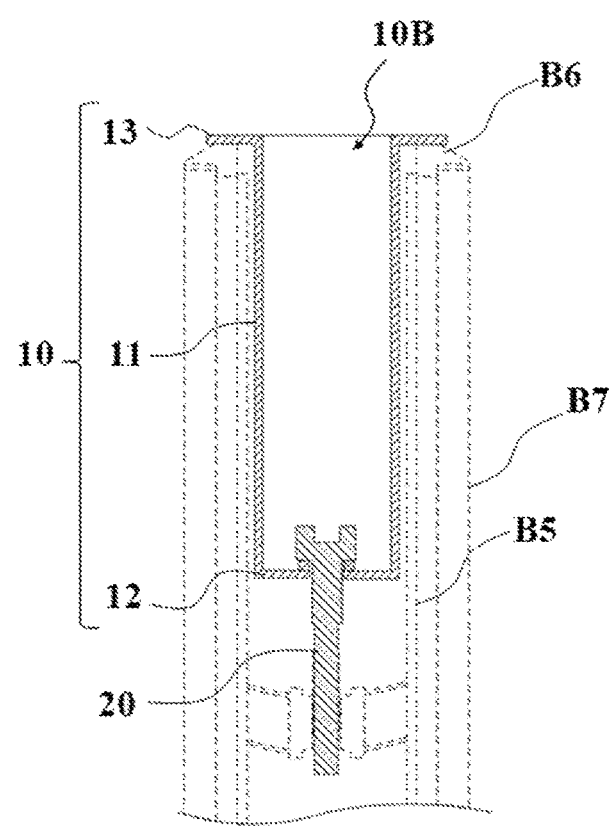

The connector 10 of the disclosure is not limited to the design as described above, in another specific embodiment, one of the side plates 11 and one of the cantilevers 13 in the design of the connector 10 as described above may be omitted and the connector 10 may achieve similar effects. At this time, the cantilever 13 may be maintained as circular or be any other shapes, and the disclosure is not limited thereto. However, in the design of one single side plate 11 and one cantilever 13, in order to ensure the resistance of the connector 10, material selection and the thickness of the connector 10 may be adjusted correspondingly. When necessary, a corresponding design change may be made to the cantilever(s) 13, too, as depicted in FIG. 5B, and the design thereof will be explained later.

The fastener 20 refers to a mechanical element or a kit that may mechanically fix or bond two or more elements together. The fastener 20 may be, for example, an element such as a screw, a stud, a screw nut, or a combination thereof. In this specific embodiment, the fastener 20 is a screw.

The gasket 40 is a hollow circular cylinder. In this embodiment, the gasket 40 is manufactured by metal, and an upper end surface and a lower end surface thereof are parallel to each other and are flat surfaces. A profile of an inner circle of the gasket 40 is slightly larger than or equal to an outer profile of a part near a terminal of the top of the fork tube B5 and corresponds to a shape of an end surface of the headset B6, so that the gasket 40 may be fitted over the outside of the terminal of the fork tube B5 and on an upper surface of the headset B6.

A setup method of the concealed bicycle lock system of the disclosure will be explained below.

Referring to FIGS. 1A, 1B and 4A, FIG. 4A is a schematic view of a relative relationship between the head tube and the fork tube at a connecting position thereof of the bicycle. To emphasize the features of each drawing, part of the elements will be represented by dashed lines. When beginning the setup of the lock system, a bicycle preparing step and a lock preparing step are performed to respectively prepare the bicycle and the lock system 1 as described above. In this embodiment, the lock preparing step includes a gasket preparing sub-step.

In this embodiment, the bicycle required to be prepared in the bicycle preparing step includes a frame and a fork. A front end of the frame has one hollow head tube B7. An opening at an upper end of the head tube B7 is embedded with one headset B6 (also known as head or head parts). There is a turntable bearing in the headset B6, so that when an external object such as the stem B4 is pressed on the head tube B7, the head tube B7 may still effectively rotate relative to the external object.

In addition, the front fork of the bicycle is an inverted Y shape, and the front fork includes two lower tubes and one upper tube. The two lower tubes are configured to make a pin connection to the front wheel B9, and the upper tube is configured to be connected to the stem B4. The upper tube as described above is generally referred to as a front fork stem in the industry, hereinafter referred to as the fork tube B5. The fork tube B5 is a hollow tubular structure. An internal thread tubular fixture made of metal is fixed into the fork tube B5. The internal thread tubular fixture is referred to as the star fangled nut B8 in the industry, the star fangled nut B8 is forcibly knocked in from the upper opening of the fork tube B5 and fixed at a specific depth in the fork tube B5. There is a screw hole in a center of the star fangled nut B8, and threads of the screw hole may be used to connect and fix an external element into the fork tube B5.

As shown in the drawing, the head tube B7 may be rotatively fitted over the outside of the fork tube B5. The fork tube B5 penetrates the head tube B7 and the headset B6 at a terminal of the head tube B7, and allows the top end of the fork tube B5 to pass through the head tube B7, so that a part of the top of the fork tube B5 is exposed from the head tube B7 for clamping by a clip-like structure at a terminal of stem B4. Another end of the stem B4 is fixed to the handlebar B1.

The stem cap B2 has a perforation. The screw B3 penetrates the stem cap B2 and is secured to and converges with threads of the star fangled nut in the fork tube B5. The stem cap B2 presses the stem B4 onto an upper opening of the fork tube B5. In this way, in addition to fixing the stem B4, the stem cap B2 effectively covers the upper opening of the fork tube B5, too. When riding the bicycle, the user swirls the handlebar B1 and drives the fork tube B5 and the front wheel B9 to rotate relative to the head tube B7 via the stem B4, thereby completing a turn.

After preparing the bicycle and the lock system 1, a disassembling step is proceeded to. In the disassembling step, first, the screw B3 of the bicycle is turned out from the stem cap B2 to separate the screw B3 from the star fangled nut B8 of the fork tube B5, and then the stem cap B2 is removed; next, the stem B4 and the handlebar B1 are removed from the fork tube B5 to expose the terminal of the fork tube B5, and the result is shown in FIG. 4B. FIG. 4B illustrates a schematic view of when the disassembling step is completed in the first embodiment of the lock system of the disclosure. In the process of disassembling, there is no need to decompose the handlebar B1 from the stem B4.

Next, the user performs a gasket placement step based on a height of the fork tube B5 relative to the head tube B7. At this time, the user fits one or more gaskets 40 over the outside of the terminal of the fork tube B5 based on the height of the fork tube B5 exposed from the head tube B7, so that a height of the terminal of the fork tube B5 is slightly lower than a height of a top surface of the gaskets 40. That is, the fork tube B5 is buried under the gaskets 40. At this time, a bottom surface of the gasket 40 at the bottom is connected to or in contact with the headset B6.

Next, a connector placement step is proceeded to, in order to embed an end of the connector 10 opposite from the substrate 12 into the fork tube B5 from the upper opening of the fork tube B5, until each of the cantilevers 13 of the connector 10 is in contact with the gaskets 40. At this time, the substrate 12 is suspended in the fork tube B5. A length of the side plates 11 of the connector 10 is slightly shorter than a depth at which the star fangled nut B8 is buried, so that after the placement of the connector 10 is completed, the substrate 12 of the connector 10 and the star fangled nut B8 still maintain a certain distance.

Next, a connector securing step is proceeded to, in order to secure the connector 10 into the fork tube B5 through the substrate 12 by using the fastener 20, as shown in FIG. 4C. FIG. 4C illustrates a schematic view of when the gasket placement step and the connector placement step are completed in the first embodiment of the lock system of the disclosure.

Specifically, after the connector 10 is inserted, the user may use a screwdriver to penetrate the annulus opening 10B of the connector 10 and rotate the fastener 20, so that the fastener 20 penetrates the securing hole 12A on the substrate 12 and engages with threads of the star fangled nut B8 in the fork tube B5. At this time, the fastener 20 is further rotated to pull the fork tube B5 in the direction towards the upper opening of the fork tube B5 and lock the fork tube B5. In this way, the fork tube B5 and the head tube B7 are tightly combined, and the displacement of the head tube B7 relative to the fork tube B5 in a vertical direction D1 is restricted, and shaking of the fork tube B5 and the head tube B7 in the vertical direction is avoided. The vertical direction D1 may be understood as the direction vertical to a diameter of the head tube B7. In this embodiment, the vertical direction D1 corresponds to the Z axis of a coordinate system, and the horizontal direction corresponds to the X axis and Y axis of the coordinate system.

On the other hand, although the gaskets 40 are under the pressure of the cantilever 13, since the headset B6 between the gaskets 40 and the head tube B7 includes the turntable bearing, the fork tube B5 and the head tube B7 may still rotate relative to each other uniaxially with one degree of freedom.

However, in some cases, the gasket preparing sub-step and the gasket placement step may be omitted. For example, referring to FIG. 5A, FIG. 5A illustrates a schematic view of a second embodiment of the disclosure. The difference between FIG. 5A and FIG. 4C is that a different design of the connector 10 is used in FIG. 5A. Specifically, when the dimensions of the fork tube B5 and the head tube B7 of the bicycle are known, the cantilever 13 of the connector 10 may be adjusted and lengthened accordingly, and may be folded downwards, so that a terminal of the cantilever 13 directly abuts against the headset B6 after the connector assembling step. In this way, the gaskets 40 may be omitted and an effect similar to that of the fork tube B5 and the head tube B7 tightly pressed against each other in the first embodiment may be achieved.

Alternatively, when the disclosure is applied to a bicycle as shown in FIG. 5B, since the height of a top end surface of the fork tube B5 is lower than the height of a top end surface of the headset B6, during the connector placement step, the cantilevers 13 of the connector 10 may directly abut against the top end of the headset B6. In this way, the gaskets 40 are omitted and an effect similar to that of the fork tube B5 and the head tube B7 tightly pressed against each other in the first embodiment may be achieved.

Following the description of FIG. 4C, after ensuring that the fork tube B5 and the head tube B7 are firmly and tightly connected, a lock placement step may be proceeded to, in order to allow the lower shaft 32 of the lock 30 to penetrate the annulus opening 10B between the cantilevers 13 of the connector 10, enter the upper opening of the fork tube B5, and be inserted into the fork tube B5, until the lock 30 may no longer move downwards. As shown in FIG. 4D, FIG. 4D illustrates a schematic view of when the lock placement step is completed in the first embodiment of the lock system of the disclosure. In application, the case 33 of the lock 30 and the cantilevers 13 of the connector 10 may be selectively disposed with various elements, for example, glue or a gasket, and the disclosure is not limited thereto.

Referring to FIGS. 6A and 6B together, the drawings show the relative positions of the lower shaft 32, the connector 10, the fastener 20, and the star fangled nut B8 in the fork tube B5 in the lock system. In addition, the X coordinate axis, the Y coordinate axis, and the Z coordinate axis may be referred to for an action direction of each element in FIGS. 6A and 6B in connection with FIG. 4D. It can be seen from the drawings that when the lock placement step is completed, the lower shaft 32 of the lock 30 is located inside the fork tube B5. The two side plates 11 of the connector 10 cover a part of an inner side wall of the fork tube B5 relative to the lower shaft 32. Another part of the two lateral openings of the inner side wall of the fork tube B5 corresponding to the channel 10A between the two side plates 11 is not covered yet. A front curved surface 321A of the upper expanding part 321 of the lower shaft 32 and a back curved surface 322A of the lower expanding part 322 respectively face the inner side walls on the two sides in the fork tube B5 corresponding to the lateral opening as described above; vertical sections 321B and 322B located on two sides of the upper expanding part 321 and the lower expanding part 322 respectively face the two side plates 11 of the connector 10 and are substantially parallel to each other.

It should be noted that in an embodiment, the connector 10 is manufactured by stamping. Before stamping, the side plates 11 and the cantilevers 13 of the connector 10 are a flat structure. During stamping, a machine folds the side plates 11 relative to the cantilevers 13, in order to form a right angle bend between the side plates 11 and the cantilevers 13; the bend is a straight edge. Therefore, the lower shaft 32 of the lock 30 correspondingly includes the two vertical sections 321B and 322B to correspond to the shape of the annulus opening 10B to ensure that the lower shaft 32 can smoothly enter the fork tube B5. A top of the vertical section 321B of the lower shaft 32 is disposed with a stepped-shaped shoulder 321C, and the lock 30 abuts against the upper side of the connector 10 through the shoulder 321C.

Referring to FIGS. 6A and 6B together, FIGS. 6A and 6B respectively illustrate schematic views of a part of the elements before a lock securing step begins and after the lock securing step is completed in the first embodiment of the lock system of the disclosure. At the beginning of the lock securing step, the user may use a tool to extend into the upper opening 31A of the upper shaft 31 to swirl the drive part 34, so that the lower expanding part 322 of the lower shaft 32 has a displacement and expands along the inclined interface 32A relative to the upper expanding part 321, that is, changing from the status in FIG. 6A to the status in FIG. 6B; at this time, the front curved surface 321A of the upper expanding part 321 and the back curved surface 322A of the lower expanding part 322 respectively pass through the two lateral openings of the connector 10, and abut against and are fixed onto the inner side wall in the fork tube B5 that is not covered by the side plates 11, so that the lower shaft 32 and the fork tube B5 are linked to move together. Conversely, by adjusting the rotating direction of the tool, the lower expanding part 322 may be allowed to converge relative to the upper expanding part 321, thereby ending the linkage status of the lower shaft 32 and the fork tube B5, that is, changing from the status of FIG. 6B back to the status of FIG. 6A.

Figure 4E:
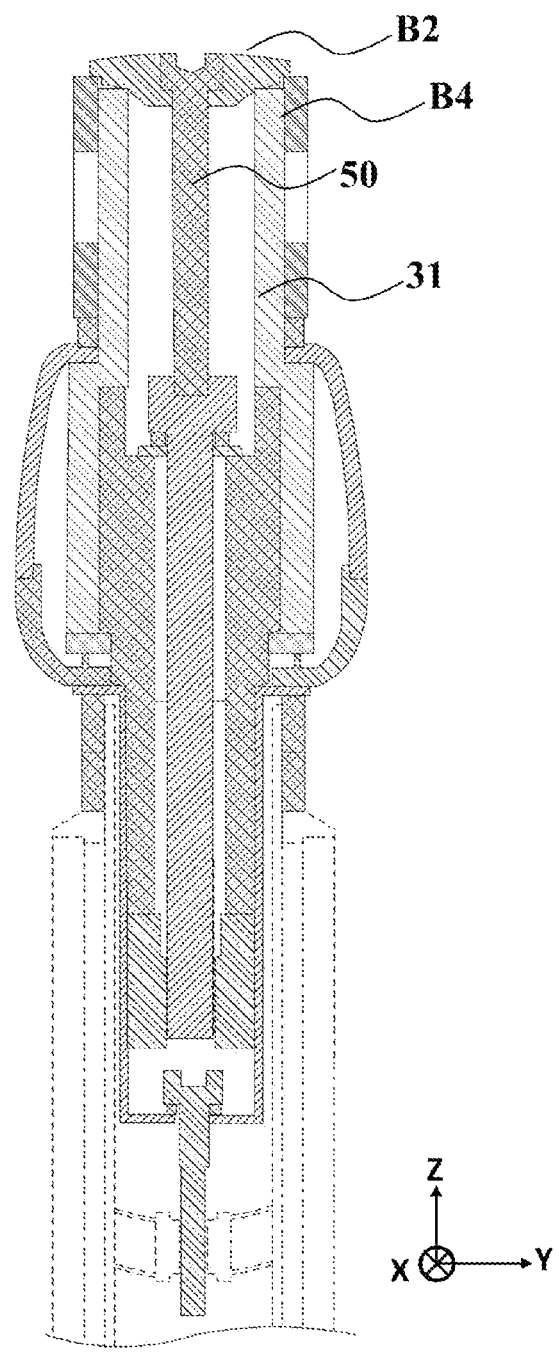
FIG. 4E illustrates a schematic view of when a stem setup step is completed in the first embodiment of the lock system of the disclosure.

Next, a stem assembly step is proceeded to. The stem assembly step is configured to clamp the stem B4 to the outside the upper shaft 31 of the lock 30, and then use the screw 50 attached to the lock system 1 to connect the stem cap B2 and the threads at the terminal of the upper shaft 31. In this way, the setup of the stem cap B2 and the stem B4 is completed. In another embodiment, the original stem cap B2 may be replaced with another stem cap (not shown) without perforation prepared in the lock system 1. Threads built in on an inner side of the stem cap may be secured to the internal threads at the terminal of the upper shaft 31 to fix the stem B4; alternatively, the stem B4 may be fixed to the terminal of the upper shaft 31 with glue or other fitting mechanisms to achieve the effect of the original stem cap B2. In this way, the independently disposed screw 50 may be omitted, further simplifying the setup process. In this way, the setup of the concealed bicycle lock system 1 of the disclosure is completed. As shown in FIGS. 1A, 1B, and 4E, FIG. 4E illustrates a schematic view of when the stem assembly step is completed in the first embodiment of the lock system of the disclosure.

Finally, it is emphasized that the scope of equivalents of the concealed bicycle lock system and the setup method thereof of the disclosure includes but is not limited to this example of implementation. The elements and steps disclosed in the previous embodiments of the disclosure are just examples, and are not intended to limit the scope of the application. Substitutions with or changes to other equivalent elements and steps shall also be covered by the claims of the present application.

What is claimed is:

1. A concealed bicycle lock system, comprising:
   a connector, comprising:
      a side plate;
      a substrate, disposed on an inner side of a lower end of the side plate, wherein the substrate is disposed with a securing hole; and
      a cantilever, disposed on an outer side of an upper end of the side plate, wherein the cantilever is configured to restrict a displacement of a head tube of a bicycle relative to a fork tube in a direction vertical to a diameter direction of the head tube;
   a fastener, configured to secure the substrate of the connector to inside of the fork tube of the bicycle through the securing hole; and
   a lock, comprising an upper shaft and a lower shaft, wherein the lower shaft comprises an expansion mechanism;
   wherein when the substrate is fixed into the fork tube by the fastener, the side plate covers a part of an inner side wall of the fork tube, and when the expansion mechanism expands, the expansion mechanism abuts against and is fixed to another part of the inner side wall that is not covered by the side plate.

2. The system according to claim 1, wherein the connector comprises a plurality of the side plates, the lower ends of the plurality of the side plates are respectively connected to the substrate, outer sides of the upper ends of the plurality of the side plates are respectively disposed with the cantilever, at least one channel is defined between the plurality of the side plates, the channel has two lateral openings, and the two lateral openings are configured to allow the expansion mechanism to pass through when the expansion mechanism expands.

3. The system according to claim 2, wherein the cantilevers of the connector surround an annulus opening, and a profile of the annulus opening corresponds to an outer profile of the lower shaft.

4. The system according to claim 1, wherein the upper shaft and the lower shaft of the lock are connected in a lock body, the upper shaft is configured to connect to a stem of the bicycle and to link and move with the stem of the bicycle, and the lower shaft is configured to connect to the fork tube of the bicycle and to link and move with the fork tube of the bicycle; the lock comprises a locked mode and an unlocked mode; when the lock is in the locked mode, the upper shaft and the lower shaft are not linked to move together, and when the lock is in the unlocked mode, the upper shaft and the lower shaft are linked to move together.

5. The system according to claim 1, wherein the expansion mechanism comprises an upper expanding part and a lower expanding part, the upper expanding part and the lower expanding part are connected via an inclined interface, an end surface of the upper shaft exposes a terminal of a drive part, the drive part is connected to the lower expanding part, and through swirling the drive part, the lower expanding part has a displacement along the inclined interface relative to the upper expanding part to allow the lower shaft to expand and move in a horizontal direction, thereby controlling the expansion mechanism to expand and converge.

6. The system according to claim 5, wherein the upper expanding part comprises a front curved surface, the lower expanding part comprises a back curved surface, the upper expanding part and the lower expanding part are respectively disposed with a vertical section corresponding to the side plate, the upper expanding part is configured to be connected to the inner side wall of a side of the fork tube via the front curved surface, and the lower expanding part is configured to be connected to the inner side wall of another side of the fork tube via the back curved surface.

7. The system according to claim 1, further comprising a gasket, configured to be fitted over a terminal of the fork tube, so that a terminal height of the fork tube is lower than the gasket.

8. The system according to claim 7, wherein the cantilever of the connector is configured to fit the gasket.

9. A setup method of a concealed bicycle lock system, comprising:
   a lock preparing step: providing a concealed bicycle lock system, comprising:
   a connector, comprising:
      a side plate;
      a substrate, disposed on an inner side of a lower end of the side plate, wherein the substrate is disposed with a securing hole; and
      a cantilever, disposed on an outer side of an upper end of the side plate, wherein the cantilever is configured to restrict a displacement of a head tube of a bicycle relative to a fork tube in a direction vertical to a diameter direction of the head tube;

a fastener, configured to secure the substrate of the connector to inside of the fork tube of the bicycle through the securing hole; and a lock, comprising an upper shaft and a lower shaft, wherein the lower shaft comprises an expansion mechanism;

wherein when the substrate is fixed into the fork tube by the fastener, the side plate covers a part of an inner side wall of the fork tube, and when the expansion mechanism expands, the expansion mechanism abuts against and is fixed to another part of the inner side wall that is not covered by the side plate;

a bicycle preparing step: providing the bicycle, comprising the head tube and the fork tube, wherein the head tube is rotatively fitted over an outside of the fork tube;

a connector placement step: embedding the substrate of the connector into the fork tube;

a connector securing step: securing the connector into the fork tube through the substrate by using the fastener, and allowing a plurality of the cantilevers to be located outside the fork tube and connected to the head tube to restrict the displacement of the head tube of the bicycle relative to the fork tube in the direction vertical to the diameter direction of the head tube;

a lock placement step: inserting the lower shaft of the lock into the fork tube; and a lock securing step: allowing the expansion mechanism of the lower shaft to expand horizontally to allow the expansion mechanism to abut against the inner side wall of the fork tube that is not covered by the side plate, so that the lower shaft and the fork tube are linked to move together.

10. The setup method according to claim 9, wherein the lock preparing step further comprises a gasket preparing sub-step: providing at least one gasket; the setup method further comprises a gasket placement step: fitting the at least one gasket over a terminal of the fork tube, so that a terminal height of the fork tube is lower than the gasket; wherein the gasket preparing sub-step and the gasket placement step are completed before the connector placement step begins, and in the connector securing step, the plurality of the cantilevers are connected to the head tube via the at least one gasket.

* * * * *